US012120726B2

United States Patent
Zhang et al.

(10) Patent No.: US 12,120,726 B2
(45) Date of Patent: Oct. 15, 2024

(54) METHODS, APPARATUS AND SYSTEMS FOR DETERMINING A TRANSMISSION POWER FOR AN UPLINK TRANSMISSION

(71) Applicant: ZTE Corporation, Shenzhen (CN)

(72) Inventors: Chenchen Zhang, Shenzhen (CN); Peng Hao, Shenzhen (CN); Xingguang Wei, Shenzhen (CN); Yu Ngok Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 460 days.

(21) Appl. No.: 17/488,932

(22) Filed: Sep. 29, 2021

(65) Prior Publication Data

US 2022/0167372 A1     May 26, 2022

Related U.S. Application Data

(63) Continuation of application No. PCT/CN2019/080591, filed on Mar. 29, 2019.

(51) Int. Cl.
*H04W 72/543*     (2023.01)
*H04L 5/00*     (2006.01)
(Continued)

(52) U.S. Cl.
CPC ......... *H04W 72/543* (2023.01); *H04L 5/0032* (2013.01); *H04W 52/146* (2013.01); *H04W 52/262* (2013.01)

(58) Field of Classification Search
CPC ............. H04W 72/543; H04W 52/146; H04W 52/262; H04W 52/223; H04W 48/12; H04W 52/34; H04L 5/0032
See application file for complete search history.

(56) References Cited

U.S. PATENT DOCUMENTS

| 2016/0021618 A1 | 1/2016 | Yin et al. |
| 2018/0146439 A1* | 5/2018 | Kim .................. H04W 52/325 |

(Continued)

FOREIGN PATENT DOCUMENTS

| CN | 103444224 A | 12/2013 |
| CN | 104902553 A | 9/2015 |

(Continued)

OTHER PUBLICATIONS

Extended European Search Report for European Patent Application No. 19923297.6 dated Oct. 17, 2022, 10 pages.
(Continued)

*Primary Examiner* — Habte Mered
(74) *Attorney, Agent, or Firm* — Crowell & Moring LLP

(57) ABSTRACT

Methods, apparatus and systems for determining a transmission power for an uplink transmission are disclosed. In one embodiment, a method performed by a wireless communication device is disclosed. The method comprises: determining or applying a transmission power for an uplink transmission of the wireless communication device based at least partially on a time threshold associated with the uplink transmission, wherein the time threshold indicates a latest time the transmission power should be determined; and performing the uplink transmission based on the transmission power to a wireless communication node.

20 Claims, 11 Drawing Sheets

(51) Int. Cl.
*H04W 52/14* (2009.01)
*H04W 52/26* (2009.01)

(56) References Cited

U.S. PATENT DOCUMENTS

| | | | |
|---|---|---|---|
| 2019/0059057 | A1 | 2/2019 | Peng et al. |
| 2019/0253976 | A1* | 8/2019 | Pelletier ............... H04W 52/146 |
| 2020/0053724 | A1* | 2/2020 | MolavianJazi ...... H04W 52/146 |
| 2020/0245256 | A1* | 7/2020 | Yang ...................... H04W 52/16 |
| 2021/0099959 | A1* | 4/2021 | Kazmi .................. H04W 52/44 |
| 2021/0227475 | A1* | 7/2021 | Tang .................... H04W 52/146 |
| 2022/0167372 | A1* | 5/2022 | Zhang ................... H04W 48/12 |

FOREIGN PATENT DOCUMENTS

| | | |
|---|---|---|
| CN | 106465283 A | 2/2017 |
| WO | WO 2013/187744 A1 | 12/2013 |
| WO | WO 2016/091276 A1 | 6/2016 |
| WO | WO 2018/010589 A1 | 1/2018 |
| WO | WO 2018/144643 A1 | 8/2018 |

OTHER PUBLICATIONS

Motorola Mobility et al., "Uplink power control for NR-NR dual-connectivity", 3GPP TSG RAN WG1 #96, RI-1902851, Athens, Greece, Feb. 25-Mar. 1, 2019, XP051600548, Retrieved from the Internet: URL:http://www.3gpp.org/ftp/tsg%5Fran/Wg1%5FRL1/TSGR1%5F96/Docs/RI%2DI902851%2Ezip, [retrieved on Feb. 16, 2019] *Chapter 3.1 Look-ahead and Cut-off Time for NR-DC Power Control*, 7 pages.

ZTE, "Discussion on uplink power control for NR-NR Dual-Connectivity", 3GPP TSG RAN WG1 Ad-Hoc Meeting 1901, RI-1900081, Taipei, Jan. 21-25, 2019, XP051593007, Retrieved from the Internet: URL:http://www.3gpp.org/ftp/Meetings%5F3GPP%5FSYNC/RAN1/Docs/RI%2DI900081%2Ezip,[retrieved on Jan. 20, 2019] *Chapter 2.2 Timeline for power determination* * figure 1 *, 4 pages.

International Search Report and Written Opinion for International Patent Application No. PCT/CN2019/080591 dated Jan. 3, 2020; 6 pages.

Office Action issued in corresponding Chinese Patent Application No. 201980094837.8 on Nov. 28, 2023 with English translation. (11 pages).

* cited by examiner

METHODS, APPARATUS AND SYSTEMS FOR DETERMINING A TRANSMISSION POWER FOR AN UPLINK TRANSMISSION

RELATED APPLICATION

This application is a continuation application of the International PCT Application No. PCT/CN2019/080591, filed with the China National Intellectual Property Administration, PRC on Mar. 29, 2019, which is incorporated herein by reference in its entirety.

TECHNICAL FIELD

The disclosure relates generally to wireless communications and, more particularly, to methods, apparatus and systems for determining a transmission power for an uplink transmission in a wireless communication.

BACKGROUND

In a fifth-generation (5G) new radio (NR) network, carrier aggregation (CA) is proposed to achieve high reliability and high data rate. With CA, two or more component carriers (CCs) are aggregated in order to support wider transmission bandwidths.

A priority has been proposed when there are various uplink transmission channels or signals in a CA scenario. For example, when a user equipment (UE) needs to transmit multiple uplink transmission channels or signals with fully or partially overlapping time domain resources, if the total uplink transmission power of the UE is not enough for the requirements of all uplink transmission channels or signals, the UE needs to prioritize the allocation of the limited uplink transmission power to the uplink transmission channels or signals with higher priority. According to an existing priority rule: for a same type of uplink transmission channel or signal in one cell group (CG), which is either a master cell group (MCG) or a secondary cell group (SCG), an uplink transmission on the primary cell has a higher priority than an uplink transmission on the secondary cell. Based on existing priority rules, the UE determines an allocation of uplink power between multiple uplink transmission channels or signals.

But merely giving the priority rules is not sufficient for a terminal or UE to decide or apply the transmit power among multiple uplink transmissions. This is because existing rules do not clarify a time for the terminal to decide or apply its uplink transmission power. Without specifying a time or time threshold for the terminal to decide or apply its uplink transmission power, it is impossible to determine whether the terminal can consider the power requirements of multiple uplink transmissions with different priority levels, which is critical for performing power allocation between multiple uplink transmissions with overlapping time domain resources, e.g. in a dual connection or multi-connection scenario.

Thus, existing systems and methods for determining the uplink transmission power in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication device is disclosed. The method comprises: determining a transmission power for an uplink transmission of the wireless communication device based at least partially on a time threshold associated with the uplink transmission, wherein the time threshold indicates a latest time the transmission power should be determined; and performing the uplink transmission based on the transmission power to a wireless communication node.

In a further embodiment, a method performed by a wireless communication node is disclosed. The method comprises: receiving an uplink transmission from a wireless communication device, wherein the uplink transmission is performed based on a transmission power that is determined based at least partially on a time threshold associated with the uplink transmission, wherein the time threshold indicates a latest time the transmission power should be determined.

In a different embodiment, a wireless communications apparatus is disclosed. The wireless communications apparatus comprises a processor and a memory, wherein the processor is configured to read code from the memory and implement a method recited in some embodiment. In yet another embodiment, a computer program product is disclosed. The computer program product comprises a computer-readable program medium code stored thereupon, the code, when executed by a processor, causing the processor to implement a method in some embodiment.

The above and other aspects and their implementations are described in greater detail in the drawings, the descriptions, and the claims.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
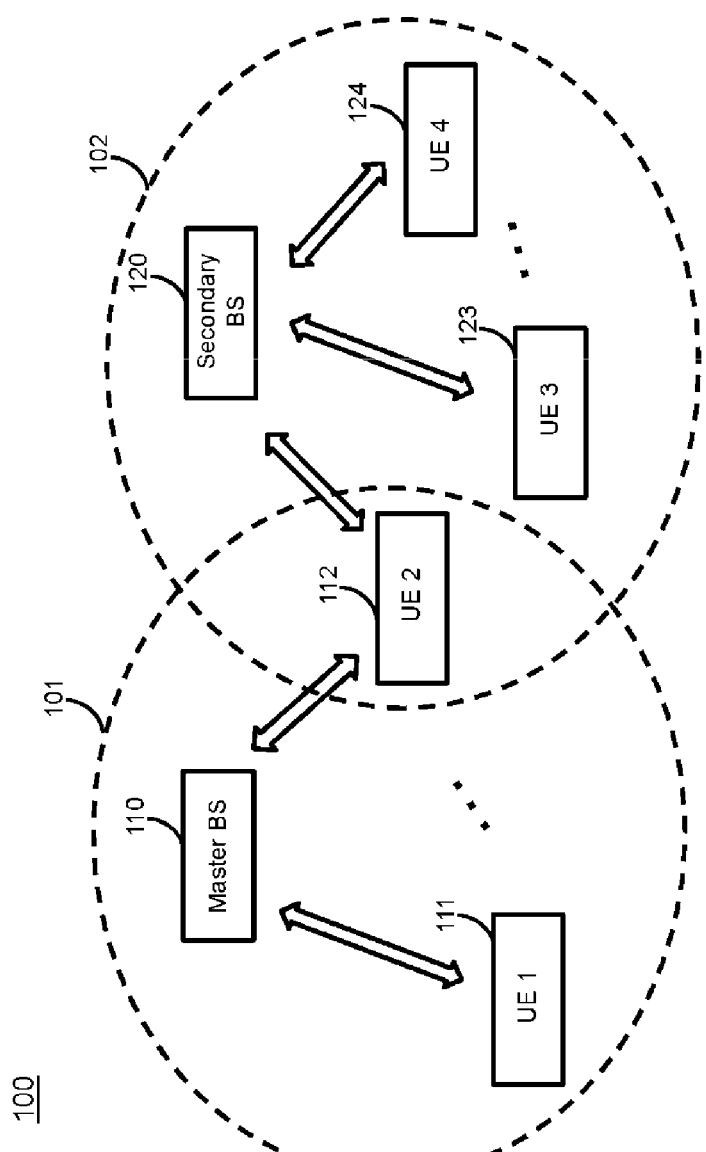
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides a geographical radio coverage, and one or more wireless user equipment devices (typically known as a "UE") that can transmit and receive data within the radio coverage. In a 5G NR network, dual connectivity (DC) is proposed to allow a UE with multiple transceivers to simultaneously transmit data to or receive data from at least two BSs, for example a Master gNodeB (MgNB or MN) and a secondary gNodeB (SgNB or SN). The UE can connect with a Master Cell Group (MCG) associated with the MN and a Secondary Cell Group (SCG) associated with the SN simultaneously so as to improve data rate, reduce latency, and improve reliability.

In a DC scenario of a UE, the schedulers of different CGs connected to the UE may or may not interact with each other in time. If the interaction does not occur in time, the different CGs will perform scheduling independently, so that the UE may need to transmit uplink transmissions in which the time domain resources are completely or partially overlapped on multiple carriers of multiple CGs. If the uplink transmission power of the UE is limited, the UE needs to consider the requirements of the uplink transmissions on multiple carriers of multiple CGs, and comprehensively decide the transmission power for each uplink transmission. For example, the UE may apply some priority rules to preferentially satisfy power requirement for an uplink transmission with a higher priority, and then apply the remaining power to satisfy power requirement of an uplink transmission with a lower priority.

The uplink transmissions of different CGs may be different in terms of: Numerology, transmission duration, transmission starting symbol, and an interval between an uplink transmission and the physical downlink control channel (PDCCH) scheduling or activating the uplink transmission. After receiving the PDCCH scheduling or activating the uplink transmission, the UE may wait for a period of time to determine the transmission power of the uplink transmission, according to various embodiments of the present teaching. As such, the UE can comprehensively consider the PDCCHs received on multiple CGs to decide the power allocation among different uplink transmissions in a more reasonable manner.

In one embodiment, a method is disclosed for determining a transmission power of an uplink transmission to a BS, where a time threshold is configured to represent a latest time the transmission power should be determined or applied. For example, a terminal or UE can determine or apply its uplink transmission power at any time not later than the time threshold, which may be determined based on a semi-static configuration by the BS or based on a system pre-definition. While there is a relationship between the uplink transmission and its corresponding time threshold, e.g. based on a time delay for preparing the uplink transmission, the relationships for different uplink transmissions may be different, the relationships for UEs with different capabilities may also be different.

In one embodiment, the UE may receive a PDCCH (including one or more symbols) from the BS for activating or scheduling the uplink transmission. Under a determination that an ending time of the one or more PDCCH symbols is before the time threshold, the UE determines or applies the transmission power no later than the time threshold. Under a determination that the ending time is not before the time threshold, the UE determines or applies the transmission power immediately after receiving the one or more PDCCH symbols.

In one embodiment, the UE may receive a power modification indication from the BS. The power modification indication indicates whether and/or how to modify at least one parameter in downlink control information (DCI) activating or scheduling the uplink transmission. The at least one parameter comprises a modulation coding scheme (MCS) and/or a transmit power control (TPC).

With the disclosed method in the present teaching, a terminal may decide or apply its uplink transmission power at a later time than the PDCCH indication scheduling the uplink transmission. As such, if the terminal receives another PDCCH indication for scheduling other uplink transmissions before its power decision time threshold, the terminal may comprehensively consider multiple uplink transmissions together to make a more reasonable power allocation decision. This will avoid a situation that a UE has to change its transmission power in the middle of an uplink transmission because a new uplink transmission request with higher priority comes after the current uplink transmission is sent.

The methods disclosed in the present teaching can be implemented in a wireless communication network, where a BS and a UE can communicate with each other via a communication link, e.g., via a downlink radio frame from the BS to the UE or via an uplink radio frame from the UE to the BS. In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a first base station (Master BS) 110 and a second base station (Secondary BS) 120. The Master BS 110 is in a master cell group (MCG) 101 which also includes a plurality of UEs, UE 1 111 ... UE 2 112, where the Master BS 110 can communicate with these UEs according to wireless protocols. Similarly, the Secondary BS 120 is in a secondary cell group (SCG) 102 which also includes a plurality of UEs, UE 2 112, UE 3 123 ... UE 4 124, where the Secondary BS 120 can communicate with these UEs according to wireless protocols. The UE 2 112 is in both the MCG 101 and the SCG 102. As such, a dual connectivity (DC) is established between the UE 2 112 and the both base stations (Master BS 110 and Secondary BS 120) at the same time. The two cell groups (and the base stations) are named master and secondary with respect to the UE 2 112. If there is an additional UE located in both the two cell groups, it is possible that the master and secondary roles of the two cell groups (and the base stations) are swapped compared to what is shown in FIG. 1.

Each UE may perform an uplink transmission to its associated BS with a transmission power determined before the uplink transmission. When the UE determines or applies its transmission power for one uplink transmission, it may consider other uplink transmissions that have overlapping time-domain resources with the uplink transmission. This is especially practical for a DC established UE, e.g. the UE 2 112. Because the Master BS 110 and the Secondary BS 120 may independently and respectively schedule two uplink transmissions for the UE 2 112, the two uplink transmissions could be scheduled with overlapping time and/or frequency resources.

Figure 2:
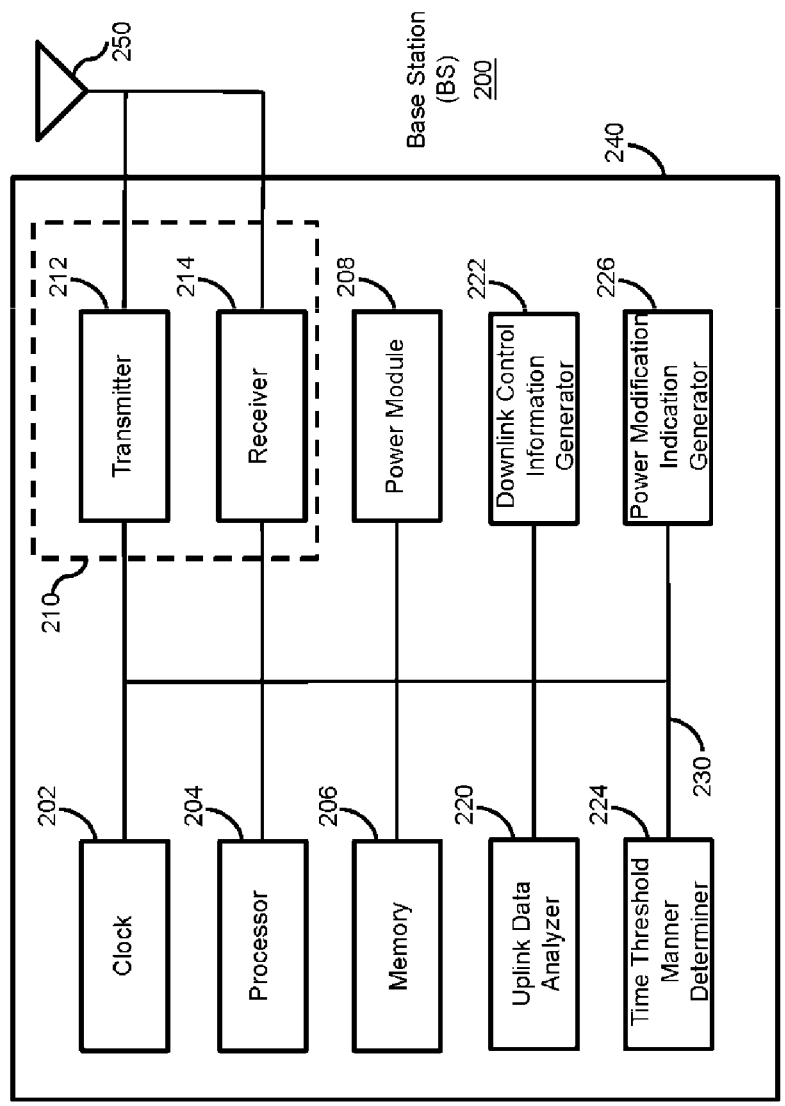
FIG. 2 illustrates a block diagram of a base station (BS), in accordance with some embodiments of the present disclosure.

FIG. 2 illustrates a block diagram of a base station (BS) 200, in accordance with some embodiments of the present disclosure. The BS 200 is an example of a device that can be configured to implement the various methods described herein. As shown in FIG. 2, the BS 200 includes a housing 240 containing a system clock 202, a processor 204, a memory 206, a transceiver 210 comprising a transmitter 212 and receiver 214, a power module 208, an uplink data analyzer 220, a downlink control information generator 222, a time threshold manner determiner 224, and a power modification indication generator 226.

In this embodiment, the system clock 202 provides the timing signals to the processor 204 for controlling the timing of all operations of the BS 200. The processor 204 controls the general operation of the BS 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc., which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the BS 200 to transmit and receive data to and from a remote device (e.g., a UE or another BS). An antenna 250 is typically attached to the housing 240 and electrically coupled to the transceiver 210. In various embodiments, the BS 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the BS 200 may receive an uplink transmission from a UE, wherein the uplink transmission is performed based on a transmission power that is determined based at least partially on a time threshold associated with the uplink transmission. For example, the uplink data analyzer 220 in this example may receive, via the receiver 214, the uplink data and analyzes them. The quality of the received uplink data is related to the uplink transmission power which is determined or applied by the UE based on the time threshold, which indicates a latest time the transmission power should be determined or applied.

According to various embodiments, the time threshold is determined based on a semi-static configuration by the BS 200 or based on a system pre-definition. In one embodiment, the time threshold is determined based on a type of the uplink transmission. In one embodiment, the time threshold is determined based on a predetermined number of time units, e.g. time slots or orthogonal frequency division multiplexing (OFDM) symbols. In one embodiment, the time threshold is determined based on a starting symbol of the uplink transmission. In one embodiment, the time threshold is related to a time delay for the UE to prepare the uplink transmission.

The time threshold manner determiner 224 in this example may receive, from the UE, information about a plurality of manners for determining the time threshold. The time threshold manner determiner 224 can generate a configuration indicating a configured manner of the plurality of manners and transmit the configuration to the UE. As such, the UE can determine the time threshold based on the configured manner. In one embodiment, the configuration comprises an index of the configured manner. In one embodiment, the configuration comprises at least one parameter related to the configured manner.

The downlink control information generator 222 in this example can transmit, via the transmitter 212, DCI including at least one symbol via physical downlink control channel (PDCCH) to the UE for activating or scheduling the uplink transmission. The transmission power may be determined based on both the time threshold and an ending time when the at least one symbol is received by the UE. For example, under a determination that the ending time is before the time threshold, the transmission power is determined no later than the time threshold; and under a determination that the ending time is not before the time threshold, the transmission power is determined immediately after receiving the at least one symbol.

In one embodiment, the UE determines whether itself is in a first situation where the UE has an additional uplink transmission having an overlapping time-domain transmission resource with the uplink transmission, or in a second situation where the UE has no additional uplink transmission having an overlapping time-domain transmission resource with the uplink transmission. In this example, the BS 200 is in a first cell group for a dual connection or multi-connection of the UE; and the additional uplink transmission is transmitted to a BS in a second cell group for the dual connection or multi-connection.

The power modification indication generator 226 in this example may generate a power modification indication for the UE. In one embodiment, the power modification indication indicates whether and how to modify at least one parameter in downlink control information (DCI) activating or scheduling the uplink transmission. In one embodiment, under a determination that the UE is in the second situation, the at least one parameter in the DCI is utilized for the uplink transmission without modification; and under a determination that the UE is in the first situation, the at least one parameter in the DCI is modified based on the power modification indication to generate at least one modified parameter, and the at least one modified parameter is utilized for the uplink transmission. The at least one parameter may comprise a modulation coding scheme (MCS) and/or a transmit power control (TPC).

In another embodiment, the power modification indication indicates whether at least one parameter in DCI activating or scheduling the uplink transmission is configured for the first situation or for the second situation. For example, under a determination that the at least one parameter in the DCI is configured for a situation which the UE is in, the at least one parameter in the DCI is utilized for the uplink transmission without modification; and under a determination that the at least one parameter in the DCI is configured for a situation which the UE is not in, the at least one parameter in the DCI is modified based on the power modification indication to generate at least one modified parameter, and the at least one modified parameter is utilized for the uplink transmission.

The power module 208 can include a power source such as one or more batteries, and a power regulator, to provide regulated power to each of the above-described modules in FIG. 2. In some embodiments, if the BS 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the BS 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the power modification indication generator 226. Conversely, each of the modules illustrated in FIG. 2 can be implemented using a plurality of separate components or elements.

Figure 3:
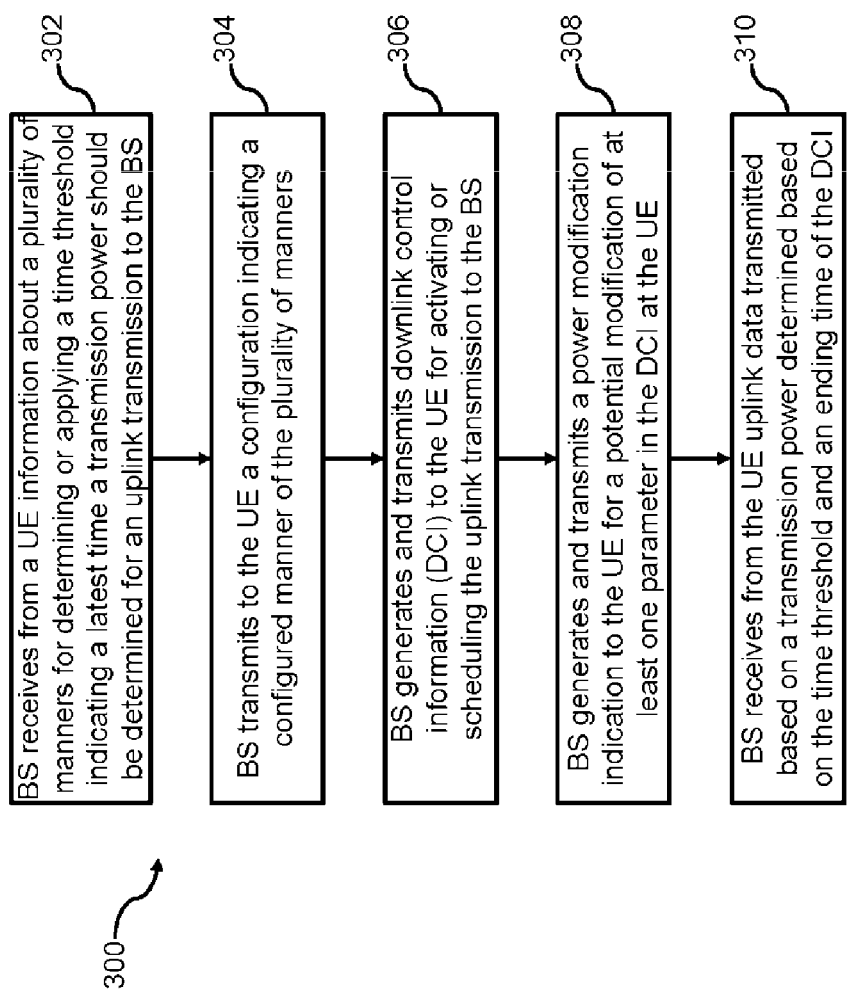
FIG. 3 illustrates a flow chart for a method performed by a BS for uplink data transmission, in accordance with some embodiments of the present disclosure.

FIG. 3 illustrates a flow chart for a method 300 performed by a BS, e.g. the BS 200 in FIG. 2, for uplink data transmission, in accordance with some embodiments of the present disclosure. At operation 302, the BS receives, from a UE, information about a plurality of manners for determining or applying a time threshold indicating a latest time a transmission power should be determined or applied for an uplink transmission to the BS. At operation 304, the BS transmits to the UE a configuration indicating a configured manner of the plurality of manners. At operation 306, the BS generates and transmits downlink control information (DCI) to the UE for activating or scheduling the uplink transmission to the BS. At operation 308, the BS generates and transmits a power modification indication to the UE for a potential modification of at least one parameter in the DCI at the UE. At operation 310, the BS receives from the UE uplink data transmitted based on a transmission power determined or applied based on the time threshold and an ending time of the DCI. The order of the steps shown in FIG. 3 may be changed according to different embodiments of the present disclosure.

Figure 4:
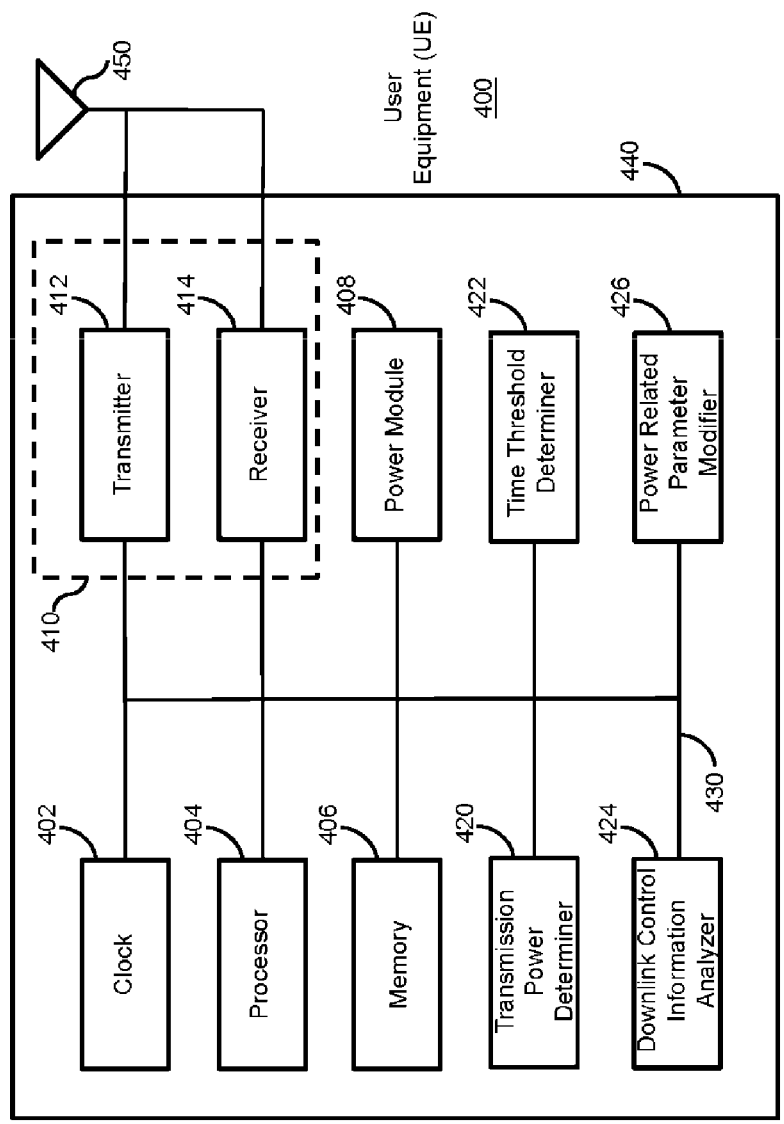
FIG. 4 illustrates a block diagram of a user equipment (UE), in accordance with some embodiments of the present disclosure.

FIG. 4 illustrates a block diagram of a UE 400, in accordance with some embodiments of the present disclosure. The UE 400 is an example of a device that can be configured to implement the various methods described herein. As shown in FIG. 4, the UE 400 includes a housing 440 containing a system clock 402, a processor 404, a memory 406, a transceiver 410 comprising a transmitter 412 and a receiver 414, a power module 408, a transmission power determiner 420, a time threshold determiner 422, a downlink control information analyzer 424, and a power related parameter modifier 426.

In this embodiment, the system clock 402, the processor 404, the memory 406, the transceiver 410 and the power module 408 work similarly to the system clock 202, the processor 204, the memory 206, the transceiver 210 and the power module 208 in the BS 200. An antenna 450 or a multi-antenna array 450 is typically attached to the housing 440 and electrically coupled to the transceiver 410.

The transmission power determiner 420 in this example may determine or apply a transmission power for an uplink transmission of the UE 400 based at least partially on a time threshold associated with the uplink transmission. The time threshold indicates a latest time the transmission power should be determined or applied. The UE 400 may perform the uplink transmission based on the transmission power to a BS.

The time threshold determiner 422 in this example may determine the time threshold based on a semi-static configuration by the BS or based on a system pre-definition. In one embodiment, the time threshold determiner 422 can determine the time threshold based on a type of the uplink transmission. In one embodiment, the time threshold determiner 422 can determine the time threshold based on a predetermined number of time units, e.g. time slots or OFDM symbols. In one embodiment, the time threshold determiner 422 can determine the time threshold based on a starting symbol of the uplink transmission. The time threshold may be related to a time delay needed by the UE 400 to prepare the uplink transmission.

In one embodiment, the time threshold determiner 422 may transmit, via the transmitter 412 to the BS, information about a plurality of manners for determining the time threshold; and receive, via the receiver 414 from the BS, a configuration indicating a configured manner of the plurality of manners. The time threshold determiner 422 may then determine the time threshold based on the configured manner. In one example, the configuration comprises an index of the configured manner. In another example, the configuration comprises at least one parameter related to the configured manner.

The downlink control information analyzer 424 in this example may receive, via the receiver 414 from the BS, DCI including at least one symbol via physical downlink control channel (PDCCH) for activating or scheduling the uplink transmission. The downlink control information analyzer 424 may analyze the DCI and send the analyzed DCI to the transmission power determiner 420 for determining or applying the transmission power based on both the time threshold and an ending time for receiving the at least one symbol.

In one embodiment, after the downlink control information analyzer 424 determines that the ending time is before the time threshold, the transmission power determiner 420 determines or applies the transmission power no later than the time threshold. In one embodiment, after the downlink control information analyzer 424 determines that the ending time is not before the time threshold, the transmission power determiner 420 determines or applies the transmission power immediately after receiving the at least one symbol.

The downlink control information analyzer 424 can also determine whether the UE 400 is in a first situation where the UE 400 has an additional uplink transmission having an overlapping time-domain transmission resource with the uplink transmission, or in a second situation where the UE 400 has no additional uplink transmission having an overlapping time-domain transmission resource with the uplink transmission, e.g. based on DCIs activating or scheduling the two uplink transmissions respectively. In one embodiment, the BS is in a first cell group for a dual connection or multi-connection of the UE 400; and the additional uplink transmission is transmitted to a BS in a second cell group for the dual connection or multi-connection.

The power related parameter modifier 426 in this example receives, via the receiver 414, a power modification indication from the BS. In one embodiment, the power modification indication indicates whether and how to modify at least one parameter in downlink control information (DCI) activating or scheduling the uplink transmission. For example, under a determination that the UE 400 is in the second situation, the power related parameter modifier 426 can utilize the at least one parameter in the DCI for the uplink transmission without modification; and under a determination that the UE 400 is in the first situation, the power related parameter modifier 426 may modify the at least one parameter in the DCI based on the power modification indication to generate at least one modified parameter, and utilize the at least one modified parameter for the uplink transmission. The at least one parameter may comprise a modulation coding scheme (MCS) and/or a transmit power control (TPC).

In another embodiment, the power modification indication indicates whether at least one parameter in downlink control information (DCI) activating or scheduling the uplink transmission is configured for the first situation or for the second situation. For example, under a determination that the at least one parameter in the DCI is configured for a situation which the UE 400 is in (i.e. both the configuration of the at least one parameter and the UE 400 correspond to a same situation, e.g. the first situation or the second situation), the power related parameter modifier 426 utilizes the at least one parameter in the DCI for the uplink transmission without modification; and under a determination that the at least one parameter in the DCI is configured for a situation which the UE 400 is not in (i.e. the configuration of the at least one parameter corresponds to the first situation and the UE 400 corresponds to the second situation, or vice versa), the power related parameter modifier 426 may modify the at least one parameter in the DCI based on the power modification indication to generate at least one modified parameter, and utilize the at least one modified parameter for the uplink transmission.

The various modules discussed above are coupled together by a bus system 430. The bus system 430 can include a data bus and, for example, a power bus, a control signal bus, and/or a status signal bus in addition to the data bus. It is understood that the modules of the UE 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the time threshold determiner 422. Conversely, each of the modules illustrated in FIG. 4 can be implemented using a plurality of separate components or elements.

Figure 5:
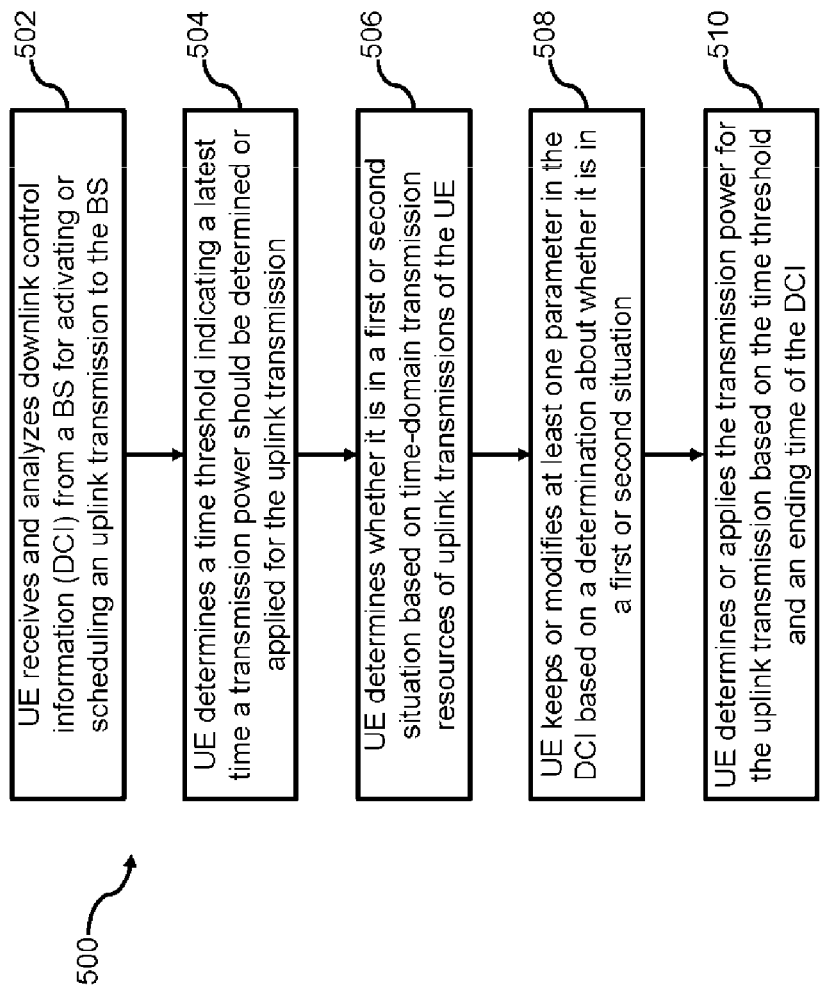
FIG. 5 illustrates a flow chart for a method performed by a UE for determining uplink transmission power, in accordance with some embodiments of the present disclosure.

FIG. 5 illustrates a flow chart for a method 500 performed by a UE, e.g. the UE 400 in FIG. 4, for determining or applying uplink transmission power, in accordance with some embodiments of the present disclosure. At operation 502, the UE receives and analyzes downlink control information (DCI) from a BS for activating or scheduling an uplink transmission to the BS. The UE determines or applies at operation 504 a time threshold indicating a latest time a transmission power should be determined or applied for the uplink transmission. At operation 506, the UE determines whether it is in a first or second situation based on time-domain transmission resources of uplink transmissions of the UE. At operation 508, the UE keeps or modifies at least one parameter in the DCI based on a determination about whether it is in a first or second situation. At operation 510, the UE determines or applies the transmission power for the uplink transmission based on the time threshold and an ending time of the DCI. The order of the steps shown in FIG. 5 may be changed according to different embodiments of the present disclosure.

Different embodiments of the present disclosure will now be described in detail hereinafter. It is noted that the features of the embodiments and examples in the present disclosure may be combined with each other in any manner without conflict.

Figure 6:
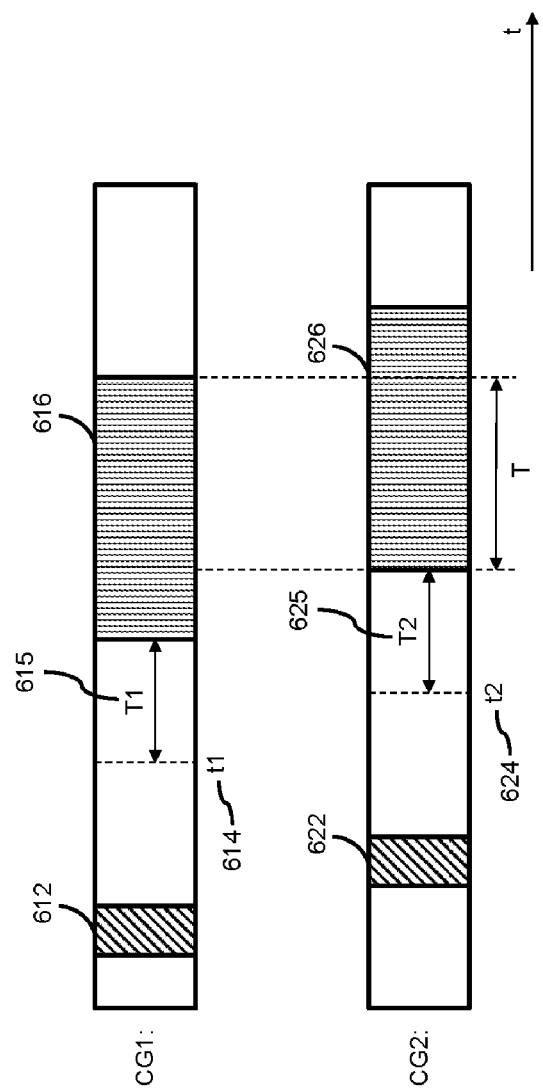
FIG. 6 illustrates an exemplary method for determining a time threshold indicating a latest time a transmission power should be determined or applied for an uplink transmission, in accordance with some embodiments of the present disclosure.

In a first embodiment, latest-power-decision time thresholds may be determined differently for different types of uplink transmissions. FIG. 6 illustrates an exemplary method for determining a time threshold indicating a latest time a transmission power should be determined or applied for an uplink transmission, in accordance with some embodiments of the present disclosure. As shown in FIG. 6, the cell group 1 (CG1) base station sends DCI1 612 to a terminal for scheduling or activating an uplink transmission 1 616, and the cell group 2 (CG2) base station sends DCI2 622 to the same terminal for scheduling or activating an uplink transmission 2 626. The time-domain transmission resources for the two uplink transmissions 616, 626 overlap, where the overlapping portion has a time length T.

After receiving the DCI1 indication, the terminal may determine or apply the transmission power of the uplink transmission 1 616. After receiving the DCI2 indication, the terminal may determine or apply the transmission power of the uplink transmission 2 626. Because the uplink transmission 1 616 has overlapping time domain resources with the uplink transmission 2 626, the terminal ensures that a sum of the transmission powers of the uplink transmission 1 616 and the uplink transmission 2 626 cannot exceed the maximum transmission power supported by the terminal within the time period T.

In order to enable the terminal to comprehensively consider the uplink transmission 1 and the uplink transmission 2 when deciding or applying the transmission power for the uplink transmission 1 616, a latest-power-decision time threshold is introduced for each uplink transmission. That is, for each given uplink transmission, the terminal needs to determine or apply the transmission power of the uplink transmission at a certain time no later than the latest-power-decision time threshold associated with the uplink transmission.

The location for the latest-power-decision time threshold of an uplink transmission may be determined as follows according to various embodiments. In one embodiment, taking the starting symbol of the uplink transmission corresponding to the latest-power-decision time threshold as a reference, the timing point is pushed backward by several time units to determine the latest-power-decision time threshold corresponding to the uplink transmission. In FIG. 6, for the uplink transmission 1 616, the time position t1 614 is determined by pushing backward the T1 time units 615 from the starting symbol boundary of the uplink transmission 1 616. As such, the time position t1 614 is the latest-power-decision time threshold of the uplink transmission 1 616. For the uplink transmission 2 626, the time position t2 624 is determined by pushing backward the T2 time units 625 from the starting symbol boundary of the uplink transmission 2 626. As such, the time position t2 624 is the latest-power-decision time threshold of the uplink transmission 2 626.

In one embodiment, each time unit is an OFDM symbol, e.g. T1 615 represents T1 OFDM symbols, T2 625 represents T2 OFDM symbols. Then the time position t1 614 may be either a starting position of a symbol determined by pushing backward T1 OFDM symbols from the starting position of the starting symbol of the uplink transmission 1 616, or an ending position of the previous symbol of the determined symbol. The time position t2 624 may be either a starting position of a symbol determined by pushing backward T2 OFDM symbols from the starting position of the starting symbol of the uplink transmission 2 626, or an ending position of the previous symbol of the determined symbol.

The terminal is supposed to determine or apply its transmission power of the uplink transmission 1 616 at a certain time no later than the time position t1 614, and determine or apply its transmission power of the uplink transmission 2 626 at a certain time no later than the time position t2 624. The values of the T1 615 and the T2 625 are related to the ability of the terminal to process uplink transmissions. The values may be predefined by the system, or semi-statically configured by the base station. According to various embodiments, the specific values of the T1 615 and the T2 625 may be based on at least one of the following:

(1) The values are equal to a time delay for the terminal to process the HARQ-ACK feedback with respect to PDSCH, where the specific value is $T_{proc,1}^{mux}$, and $T_{proc,1}^{mux}=(N_1+d_{1,1}+1) \cdot (2048+144) \cdot \kappa \cdot 2^{-\mu} \cdot T_C$. The parameters involved in this formula have the following values: the value of $N_1$ is related to the terminal capability, PDSCH Numerology, uplink transmission Numerology, and DMRS (Demodulation Reference Signal) time-frequency resource location; the value of $d_{1,1}$ is related to the PDSCH mapping type, the terminal capability, and the PDSCH time domain length; the value of $\mu$ is related to PDCCH Numerology, PDSCH Numerology, and uplink transmission Numerology; the time units $T_C=1/(\Delta f_{max} \cdot N_f)$, where $\Delta f_{max}=480 \cdot 10^3$ and $N_f=4096$; the constant $\kappa=T_s/T_C=64$, where $T_s=1/(\Delta f_{ref} \cdot N_{f,ref})$, $\Delta f_{ref}=15 \cdot 10^3$ Hz, and $N_{f,ref}=2048$.

(2) The values are related to a time delay for the terminal to process the HARQ-ACK feedback with respect to PDSCH, where the specific value is $x*T_{proc,1}^{mux}$, where $T_{proc,1}^{mux}=(N_1+d_{1,1}+1) \cdot (2048+144) \cdot \kappa \cdot 2^{-\mu} \cdot T_C$, x is a constant, e.g. x may be 0.5 or 1, x can be defined by the system, or semi-statically configured by the base station.

(3) The values are related to a time delay for the terminal to process the HARQ-ACK feedback with respect to PDSCH, where the specific value is $(1/x)*T_{proc,1}^{mux}$, where $T_{proc,1}^{mux}=(N_1+d_{1,1}+1) \cdot (2048+144) \cdot \kappa \cdot 2^{-\mu} \cdot T_C$, x is an integer, e.g. x may be 1, 2 or 3, x can be defined by the system, or semi-statically configured by the base station.

(4) The values are equal to a time delay for the terminal to process the HARQ-ACK feedback with respect to a semi-persistent PDSCH release command, where the specific value is $T_{proc,release}^{mux}$, $T_{proc,release}^{max}=(N+1) \cdot$ $(2.048+144)\cdot\kappa\cdot 2^{-\mu}\cdot T_C$. The parameters involved in this formula (have the following values: the value of N is related to the terminal capability and, PDCCH Numerology. For a UE with processing capability 1 and for the SCS of the PDCCH reception, N=10 for 15 kHz, N=12 for 30 kHz, N=33 for 60 kHz, and N=25 for 120 kHz. For a UE with processing capability 2 and for the SCS of the PDCCH reception, N=5 for 15 kHz, N=5.5 for 30 kHz, and N=11 for 60 kHz. The meanings of the other parameters have been explained above.

(5) The values are related to a time delay for the terminal to process the HARQ-ACK feedback with respect to a semi-persistent PDSCH release command, where the specific value is $x*T_{proc,release}^{mux}$, where $T_{proc,release}^{mux}=(N+1)\cdot(2048+144)\cdot\kappa\cdot 2^{-\mu}\cdot T_C$, x is a constant, for example, it can be 0.5 or 1, x can be defined by the system, or semi-statically configured by the base station.

(6) The values are related to a time delay for the terminal to process the HARQ-ACK feedback with respect to a semi-persistent PDSCH release command, where the specific value is $(1/x)*T_{proc,release}^{mux}$, where $T_{proc,2}^{mux}=\max((N_2+d_{2,1}+1)\cdot(2048+144)\cdot\kappa\cdot 2^{-\mu}\cdot T_C, d_{2,2})$, x is an integer, for example, it can be 1, 2 or 3, x can be defined by the system, or semi-statically configured by the base station.

(7) The values are equal to a time delay for the terminal to process the PUSCH scheduled by the PDCCH, and the specific value is $T_{proc,2}^{mux}$, $T_{proc,2}^{mux}=\max((N_2+d_{2,1}+1)\cdot(2048+144)\cdot\kappa\cdot 2^{-\mu}\cdot T_C, d_{2,2})$. The parameters involved in this formula have the following values: the value of $N_2$ is related to the terminal capability, PDCCH Numerology, and uplink transmission Numerology; $d_{2,1}=0$ or $d_{2,1}=1$; $d_{2,2}=0$ or $d_{2,2}$ is equal to BWP conversion delay. The meanings of the other parameters have been explained above.

(8) The values are related to a time delay for the terminal to process the PUSCH scheduled by the PDCCH, and the specific value is $x*T_{proc,2}^{mux}$, where $T_{proc,2}^{mux}=\max((N_2+d_{2,1}+1)\cdot(2048+144)\cdot\kappa\cdot T_C, d_{22})$, x is a constant, for example, it can be 0.5 or 1, x can be defined by the system, or semi-statically configured by the base station.

(9) The values are related to a time delay for the terminal to process the PUSCH scheduled by the PDCCH, and the specific value is $(1/x)*T_{proc,2}^{mux}$, where $T_{proc,2}^{mux}=\max((N_2+d_{2,1}+1)\cdot(2048+144)\cdot\kappa\cdot 2^{-\mu}\cdot T_C, d_{2,2})$, x is an integer, for example, it can be 1, 2 or 3, x can be defined by the system, or semi-statically configured by the base station.

(10) The values are equal to a time delay for the terminal to process the PUCCH (Physical Uplink Control Channel)/PUSCH(Physical Uplink Shared Channel) including the aperiodic CSI feedback, and the specific value is $T_{proc,CSI}^{mux}$, $T_{proc,CSI}^{mux}=\max((Z+d)\cdot(2048+144)\cdot\kappa\cdot 2^{-\mu}\cdot T_C, d_{2,2})$. The value of Z is related to the terminal capability, the number of updated CSI reports, etc.; d is equal to 2 or 3 or 4. The meanings of the other parameters have been explained above.

(11) The values are related to a time delay for the terminal to process the PUCCH/PUSCH including the aperiodic CSI feedback, and the specific value is $x*T_{proc,CSI}^{mux}$, where $T_{proc,CSI}^{mux}=\max((Z+d)\cdot(2048+144)\cdot\kappa\cdot 2^{-\mu}\cdot T_C, d_{2,2})$, x is a constant, for example, it can be 0.5 or 1, x can be defined by the system, or semi-statically configured by the base station.

(12) The values are related to a time delay for the terminal to process the PUCCH/PUSCH including the aperiodic CSI feedback, and the specific value is $(1/x)*T_{proc,CSI}^{mux}$ where $T_{proc,CSI}^{mux}=\max((Z+d)\cdot(2048+144)\cdot\kappa\cdot 2^{-\mu}\cdot T_C, d_{2,2})$, x is an integer, for example, it can be 1, 2 or 3, x can be defined by the system, or semi-statically configured by the base station.

Using the first uplink transmission 616 as an example, for different types of uplink transmissions, the T1 615 may be the same based on a system pre-definition or a semi-static configuration of the base station. For example, regardless of the type of the uplink transmission 1 616, the T1 615 is the same. As such, for any given uplink transmission, the terminal has the same latest-power-decision time threshold relative to the associated uplink transmission. That is, in this example, T1=T2.

In another example, for different types of uplink transmissions, the system pre-defined or base station semi-statically configured T1 615 may be different, e.g. based on the specific type of the uplink transmission 1 616. When the uplink transmission 1 616 includes HARQ-ACK feedback for PDSCH transmission, the T1 615 is determined based on one of the above strategies (1)-(3). When the uplink transmission 1 616 includes HARQ-ACK feedback for a semi-persistent PDSCH release command, the T1 615 is determined based on one of the above strategies (4)-(6). When the uplink transmission 1 616 includes PUSCH/PUCCH activated or scheduled by PDCCH, the T1 615 is determined based on one of the above strategies (7)-(9). When the uplink transmission 1 616 includes an aperiodic CSI feedback, the T1 615 is determined based on one of the above strategies (10)-(12). Since the T1 615 is different for different types of uplink transmissions, the terminal will have different latest-power-decision time thresholds relative to their respectively different types of uplink transmissions. That is, in this example, T1 may not be the same as T2, when the uplink transmission 1 616 and the uplink transmission 2 626 are of different types.

In a second embodiment, the transmission power may be determined or applied at a power decision timing point, based on a latest-power-decision time threshold that is implicitly indicated. Based on a parameter pre-defined by the system or semi-statically configured by the base station, for example, the value of the parameter T1 as determined in the first embodiment, the terminal can determine the latest-power-decision time threshold of the uplink transmission 1 activated or scheduled by DCI1. There may be three cases for the relationship between the latest-power-decision time threshold determined by the terminal for the uplink transmission 1 and an ending symbol of the DCI1 activating or scheduling the uplink transmission 1, as shown in FIG. 7, FIG. 8 and FIG. 9 respectively.

Figure 7:
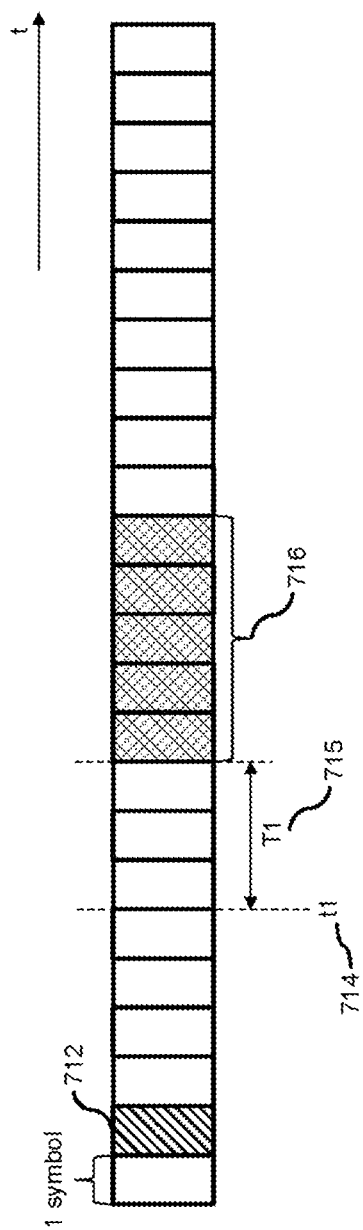
FIG. 7 illustrates a first exemplary relationship between an ending time of downlink control information (DCI) for activating or scheduling an uplink transmission and a time threshold associated with the uplink transmission, in accordance with some embodiments of the present disclosure.

In the case shown in FIG. 7, the latest-power-decision time threshold t1 714 determined by the terminal for the uplink transmission 1 716 is after the end symbol of the DCI1 712. As such, the terminal considers that it does not need to decide or apply the transmission power of the uplink transmission 1 716 upon receiving the DCI1 712. It may decide or apply the transmission power of the uplink transmission 1 716 at any time no later than the latest-power-decision time threshold t1 714. In this case, if before the latest-power-decision time threshold t1 714 in FIG. 7, the terminal also receives a PDCCH indication activating or scheduling an uplink transmission 2 that has overlapping time domain resources with the uplink transmission 1 716, the terminal may consider whether to reserve power for the uplink transmission 2 and/or how much power to reserve, when deciding or applying the transmission power for the uplink transmission 1 716. If the terminal only receives the PDCCH indication activating or scheduling the uplink transmission 2 having overlapping time domain resources with the uplink transmission 1 716 after the latest-power-decision time threshold t1 714 in FIG. 7, then the terminal need not to consider the uplink transmission 2 when deciding or applying the transmission power for the uplink transmission 1 716.

Figure 8:
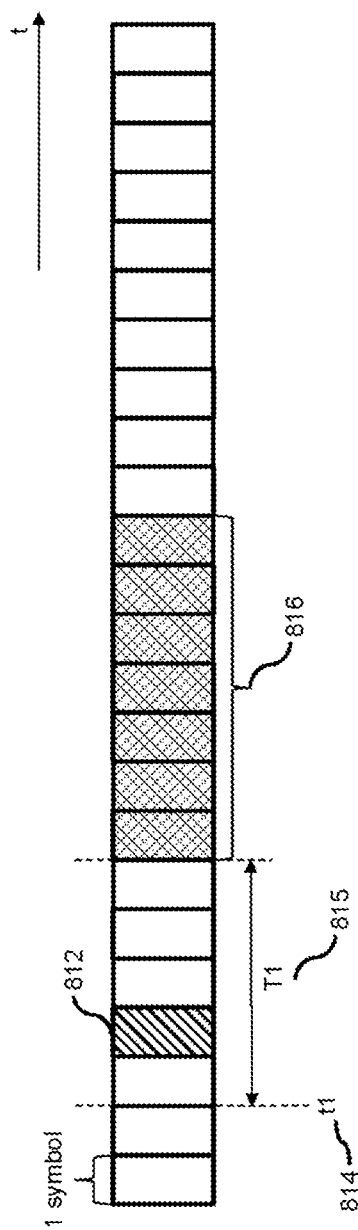
FIG. 8 illustrates a second exemplary relationship between an ending time of DCI for activating or scheduling an uplink transmission and a time threshold associated with the uplink transmission, in accordance with some embodiments of the present disclosure.

In the case shown in FIG. 8, the latest-power-decision time threshold t1 814 determined by the terminal for the uplink transmission 1 816 is before the end symbol of the DCI1 812. As such, the terminal considers that it needs to determine or apply the transmission power of the uplink transmission 1 816 upon receiving the DCI1 812 without waiting. That is, the latest-power-decision time threshold t1 814 determined by the terminal according to T1 815 is ineffective in this case. Therefore, if the terminal receives the PDCCH indication activating or scheduling the uplink transmission 2 having overlapping time domain resources with the uplink transmission 1 816 after the end symbol of the DCI1 812, the terminal will not consider whether to reserve the transmission power for the uplink transmission 2 when determining or applying the transmission power of the uplink transmission 1 816.

Figure 9:
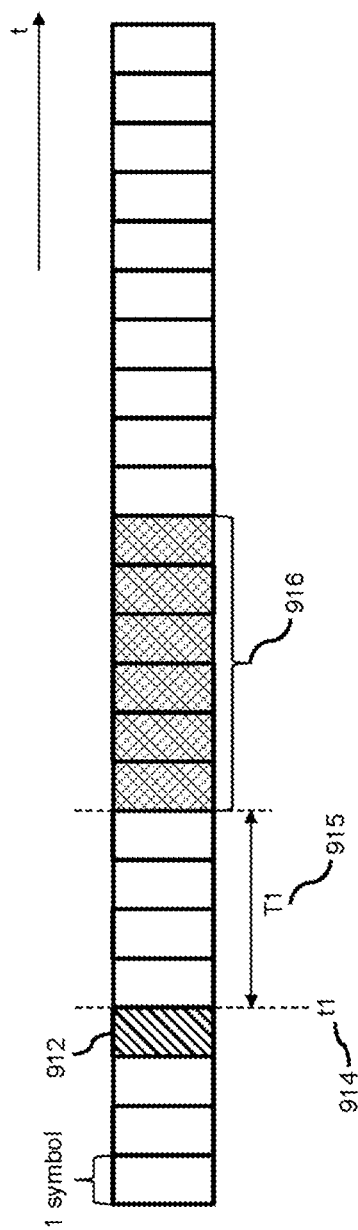
FIG. 9 illustrates a third exemplary relationship between an ending time of DCI for activating or scheduling an uplink transmission and a time threshold associated with the uplink transmission, in accordance with some embodiments of the present disclosure.

In the case shown in FIG. 9, the latest-power-decision time threshold t1 914 determined by the terminal for the uplink transmission 1 916 is exactly at the end symbol position of the DCI1 912. The terminal considers that it needs to determine or apply the transmission power of the uplink transmission 1 916 upon receiving the DCI1, and cannot delay the power decision. Therefore, if the terminal receives the PDCCH indication activating or scheduling the uplink transmission 2 having overlapping time domain resources with the uplink transmission 1 916 after the end symbol of the DCI1 912, the terminal will not consider whether to reserve the transmission power for the uplink transmission 2 when determining or applying the transmission power of the uplink transmission 1 916.

As can be seen from the situations in FIG. 7, FIG. 8 and FIG. 9, based on the time relationship between the latest-power-decision time threshold and the end symbol of the PDCCH scheduling or activating the target uplink transmission, the terminal can know whether the latest-power-decision time threshold is valid or effective. If the latest-power-decision time threshold is valid, the terminal may decide or apply the transmission power of the uplink transmission at a time no later than the latest-power-decision time threshold; if the latest-power-decision time threshold is invalid or ineffective, the terminal determines or applies the transmission power of the uplink transmission immediately after receiving the PDCCH scheduling or activating the target uplink transmission.

The terminal may be said not to support a look-ahead mechanism, when the terminal needs to determine or apply the transmission power of the target uplink transmission immediately after receiving the PDCCH that schedules or activates the target uplink transmission. The terminal may be said to support the look-ahead mechanism, when the terminal determines or applies the transmission power of the target uplink transmission at a time no later than the latest-power-decision time threshold. The latest-power-decision time threshold is after the terminal receives the PDCCH that schedules or activates the target uplink transmission. Thus the terminal can adaptively determine whether to support the look-ahead mechanism or not, based on the latest-power-decision time threshold and the receiving position of the PDCCH.

In a third embodiment, a MCS/TPC offset or modification may be indicated in PDCCH for different transmission powers. When the system provides dual connectivity (DC) including CG1 and CG2 for the terminal, the base station of the CG1 and the base station of the CG2 can independently schedule the uplink transmissions of the terminal. If the base station of the CG1 and the base station of the CG2 respectively schedule the uplink transmission 1 and the uplink transmission 2 for the terminal, and the time domain resources of the uplink transmission 1 and the uplink transmission 2 overlap fully or partially, the terminal needs to allocate all of its transmission powers available to the two uplink transmissions in the two cell groups. When allocating its available transmission power to the two transmissions in two cell groups respectively, the transmission power in each transmission may be smaller than the BS-expected transmission power of the terminal, compared to the situation when the terminal uses all of its available transmission power for the transmission in one CG. Therefore, this may cause the demodulation requirement under the MCS indicated by the base station for the uplink transmission not satisfied due to the decrease of the transmission power of the terminal. In this case, an offset of the MCS and/or the TPC may be indicated in the PDCCH for scheduling or activating the uplink transmission.

Figure 10:
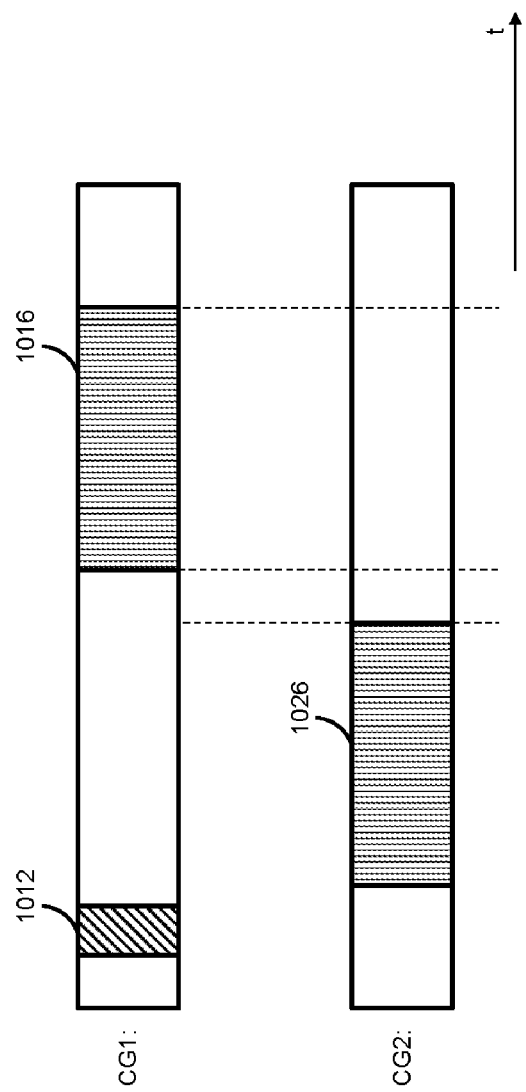
FIG. 10 illustrates a first exemplary situation in which a UE has two scheduled uplink transmissions with non-overlapping time-domain transmission resources, in accordance with some embodiments of the present disclosure.
Figure 11:
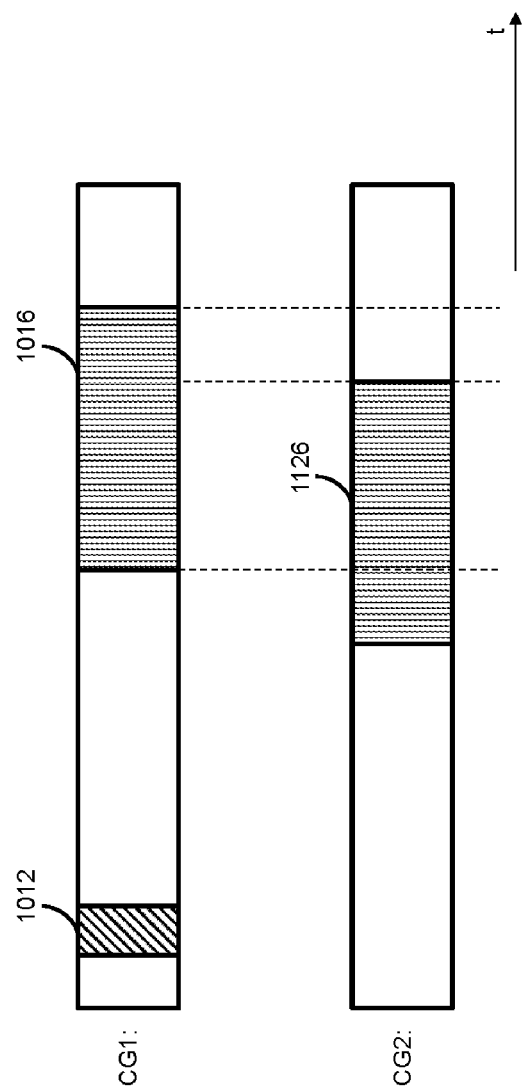
FIG. 11 illustrates a second exemplary situation in which a UE has two scheduled uplink transmissions with overlapping time-domain transmission resources, in accordance with some embodiments of the present disclosure.

As shown in FIG. 10 and FIG. 11, the CG1 base station transmits DCI1 1012 scheduling or activates uplink transmission 1 1016. The CG1 base station may be uncertain whether there will be uplink transmission 2 on the CG2 having time domain resource overlap with the uplink transmission 1 1016, i.e. the CG1 base station does not know whether the terminal is in a first situation shown in FIG. 10 or in a second situation shown in FIG. 11. In this case, the base station of CG1 may use a power modification indication, e.g. a transmission-power-offset bit field in DCI1 1012, to indicate that when there is an uplink transmission in CG2 having overlapping time domain transmission resource with the uplink transmission 1 1016, the terminal should modify the MCS and/or the TPC applied to the uplink transmission 1 1016 and indicated in the DCI1 1012. There are at least the following two manners to indicate the bit field in the DCI1 1012 and adjust the MCS and/or the TPC.

According to a first manner, the MCS field and/or the TPC field indicated in DCI1 1012 represents the MCS and/or TPC used by the terminal for the uplink transmission 1 1016, when there is no uplink transmission in CG2 having overlapping time domain transmission resource with the uplink transmission 1 1016. For example, the transmission-power-offset bit field in DCI1 1012 contains n bits, to indicate up to $2^n$ kinds of MCS and/or TPC offset sizes. The specific $2^n$ offset sizes for MCS/TPC may be configured semi-statically by the base station or predefined by the system. For example, n is 1 means the transmission-power-offset bit field contains 1 bit. Setting the bit to "0" means that the MCS is shifted downward by 1 level; and setting the bit to "1" means that the MCS is shifted downward by 2 levels. Alternatively, setting this bit to "0" indicates that the TPC is shifted downward by 3 dB; setting this bit to "1" indicates that the TPC is shifted downward by 6 dB. After receiving the DCI1 1012, the terminal reads the MCS domain and/or the TPC domain, and the transmission-power-offset bit field. The terminal determines how to adjust the MCS and/or TPC used for the uplink transmission 1, based on the system-defined or BS-semi-statically configured meanings of different values of the transmission-power-offset bit field, and based on whether there is an uplink transmission in CG2 having overlapping time domain transmission resource with the uplink transmission 1 1016. For example, if the terminal determines that it is in a situation as shown in FIG. 10, i.e. there is no uplink transmission in CG2 having overlapping time domain resource with the uplink transmission 1 1016 in CG1, the terminal will ignore the indication of the transmission-power-offset bit field in DCI1 1012, and directly apply the MCS and/or TPC indication in the DCI1 1012 to perform the uplink transmission 1 1016. If the terminal determines that it is in a situation as shown in FIG. 11, i.e. there is an uplink transmission 2 1126 in CG2 having overlapping time domain resource with the uplink transmission 1 1016 in CG1, the terminal will read the indication of the transmission-power-offset bit field in DCI1 1012, and modify the MCS and/or TPC of the uplink transmission 1 1016 indicated in DCI1 according to the meaning of different values of the transmission-power-offset bit field that is pre-defined by the system or semi-statically configured by the base station.

According to a second manner, the transmission-power-offset bit field indicated in the DCI1 1012 indicates that whether the MCS and/or the TPC in the DCI1 1012 is to be used for a first situation as shown in FIG. 10 or for a second situation as shown in FIG. 11. Thus the transmission-power-offset bit filed in this case only needs to include one bit. For example, setting this bit to "0" represents that the MCS and/or the TPC in the DCI1 1012 is to be used for a first situation as shown in FIG. 10; setting this bit to "1" represents that the MCS and/or the TPC in the DCI1 1012 is to be used for a second situation as shown in FIG. 11. If the terminal determines that it is in a situation same as what the transmission-power-offset bit field in the DCI1 1012 indicates for, then the terminal directly apply the MCS and/or TPC indication in the DCI1 1012 to perform the uplink transmission 1 1016 without modification. If the terminal determines that it is in a situation different from what the transmission-power-offset bit field in the DCI1 1012 indicates for, then the terminal modifies the MCS and/or TPC of the uplink transmission 1 1016 indicated in DCI1 1012, according to the meaning of different values of the transmission-power-offset bit field that is pre-defined by the system or semi-statically configured by the base station, and performs the uplink transmission 1 1016 based on the modified MCS and/or TPC.

In a fourth embodiment, a variety of different look-ahead capabilities is discussed. The terminal may report its own look-ahead capability to the base station. The base station can configure a look-ahead capability for the terminal through RRC signaling according to the report from the terminal and the requirement of the base station. For example, N types of look-ahead capabilities may be pre-configured by the system or semi-statically configured by the base station for the terminal. The base station configures one of the N types to the terminal through RRC signaling for an uplink transmission.

The difference between N kinds of look-ahead capabilities can be based on at least one of the following: (1) capability 1 means using processing delay 1 as T1 and capability 2 means using processing delay 2 as T1; (2) capability 1 means using a multiplying product of a coefficient x1 and the processing delay 1 as T1, and capability 2 means using a multiplying product of a coefficient x2 and the processing delay 1 as T1, where x1 and x2 are different constants.

Correspondingly, the look-ahead capability reported by the terminal may be at least one of the following: (1) using the processing delay 1 as T1 or using the processing delay 2 as T1; (2) with the processing time delay 1 being a reference, using either the coefficient x1 or the coefficient x2 to multiply the reference processing time delay 1 to generate T1. The reference is predefined by the system or semi-statically configured by the base station for the terminal.

If the system has pre-defined or the base station has semi-statically configured the specific meanings of the N types of look-ahead capabilities, the base station may configure the capability number or index to the terminal through RRC signaling. For example, the base station may indicate the terminal 1 to use the look-ahead capability 1, and indicate the terminal 2 to use the look-ahead capability 2.

If the system has not pre-defined and the base station has not semi-statically configured the specific meanings of the N types of look-ahead capabilities for the terminal, the base station may configure the specific capability parameters for the terminal through RRC signaling. For example, the base station may instruct the terminal 1 to use the look-ahead capability of using the processing delay 1 as T1, and instructs terminal 2 to use the look-ahead capability of using the processing delay 2 as T1. Alternatively, the base station instructs the terminal 1 to use the look-ahead capability of multiplying the reference by the coefficient x1, and instructs the terminal 2 to use the look-ahead capability of multiplying the reference by the coefficient x2.

In a fifth embodiment 5, the terminal may dynamically determine the priority of the CG. Based on the DCI indication on each CG, the terminal may dynamically determine that: when the CG1 and the CG2 have uplink transmissions with overlapping time-domain resources, the uplink transmission on which CG has a higher priority and/or which uplink transmission power threshold should be used. For example, the DCI1 sent by the CG1 base station to the terminal indicates that the uplink transmission 1 is scheduled, and the DCI2 sent by the CG2 base station to the terminal indicates that the uplink transmission 2 is scheduled, and the uplink transmission 1 has overlapping time domain resource with the uplink transmission 2.

The system pre-defines or the base station semi-statically configures to the terminal a priority rule for different types of uplink transmissions, e.g. PRACH (Physical Random Access Channel)>PUCCH=PUSCH carrying UCI (Uplink Control Information)>PUSCH not carrying UCI>SRS (Sounding Reference Signal), in order of priority from high to low. The terminal compares the priorities of the uplink transmission 1 and the uplink transmission 2 according to the priority rule. If the priority of the uplink transmission 1 is higher than that of the uplink transmission 2, the terminal considers that the uplink transmission 1 has a higher priority than the uplink transmission 2 after receiving the DCI1 and the DCI2.

The terminal preferentially guarantees the uplink transmission of the CG with a higher priority. For the uplink transmission of the CG with a lower priority, if the terminal has limited power, the uplink transmission of the CG with the lower priority may be canceled or performed with a decreased transmission power.

In one exemplary method, the base station configures two sets of uplink transmission power thresholds to the terminal. The first set of uplink transmission power thresholds comprises an uplink transmission power threshold P1 on CG1 and an uplink transmission power threshold P2 on CG2. The second set of uplink transmission power thresholds comprises an uplink transmission power threshold P1' on CG1 and an uplink transmission power threshold P2' on CG2.

The system pre-defines or the base station semi-statically configures to the terminal that: the first set of uplink transmission power thresholds is applied for an uplink transmission with a high priority; and the second set of uplink transmission power thresholds is applied for an uplink transmission with a low priority. For example: the first set of uplink transmission power thresholds is: {P1=0.8, P2=0.7}, and the second set of uplink transmission power thresholds is {P1'=0.5, P2'=0.5}.

Based on the received indications of DCI1 and DCI2, the terminal can determine the relative priorities for the uplink transmission 1 and the uplink transmission 2. For a CG where a high priority transmission is located, the first set of uplink transmission power thresholds should be used for the CG. For a CG where a low priority transmission is located, the second set of uplink transmission power thresholds should be used for the CG. For example, the terminal determines that the uplink transmission 1 has a higher priority than that of the uplink transmission 2. Then the terminal uses P1=0.8 as the uplink transmission power threshold for the uplink transmission 1; and the terminal uses P2'=0.5 as the uplink transmission power threshold for the uplink transmission 2.

In another exemplary method, the base station equivalently configures two sets of uplink transmission power thresholds to the terminal. The equivalent configuration means that the base station may configure only a first set of uplink transmission power thresholds to the terminal, and the terminal may calculate a second (the other) set of uplink transmission power thresholds based on the first set of uplink transmission power thresholds and based on the maximum power limit. For example, if the first set of uplink transmission power thresholds configured by the base station is {P1=0.8, P2=0.7} and the maximum power upper limit is 1, the terminal can calculate the second set of uplink transmission power thresholds as {P1'=1−0.8=0.2, P2'=1−0.7=0.3}.

Based on the received indications of DCI1 and DCI2, the terminal can determine the relative priorities for the uplink transmission 1 and the uplink transmission 2. For a CG where a high priority transmission is located, the first set of uplink transmission power thresholds should be used for the CG. For a CG where a low priority transmission is located, the second set of uplink transmission power thresholds should be used for the CG. For example, the terminal determines that the uplink transmission 1 has a higher priority than that of the uplink transmission 2. Then the terminal uses P1=0.8 as the uplink transmission power threshold for the uplink transmission 1; and the terminal uses P2'=0.3 as the uplink transmission power threshold for the uplink transmission 2. Each CG described above may comprise one or more carriers.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a wireless communication device, the method comprising:
   determining a transmission power for an uplink transmission of the wireless communication device based at least partially on a time threshold associated with the uplink transmission, wherein the time threshold indicates a latest time the transmission power should be determined, and wherein the time threshold is determined with consideration of at least one of:
   whether the uplink transmission carries a hybrid automatic repeat request (HARQ) feedback;
   whether the uplink transmission carries a Physical Uplink Control Channel (PUCCH) or a Physical Uplink Shared Channel (PUSCH) scheduled or activated by a Physical Downlink Control Channel (PDCCH); or
   whether the uplink transmission carries an aperiodic Channel State Information (CSI) feedback; and
   performing the uplink transmission based on the transmission power to a wireless communication node.

2. The method of claim 1, wherein the time threshold is determined based on one of: a semi-static configuration by the wireless communication node or based on a system pre-definition, or a type of the uplink transmission, and wherein the time threshold is related to a time delay for the wireless communication device to prepare the uplink transmission.

3. The method of claim 1, further comprising:
   receiving at least one symbol via physical downlink control channel (PDCCH) from the wireless communication node for activating or scheduling the uplink transmission, wherein the transmission power is determined based on both the time threshold and an ending time for receiving the at least one symbol.

4. The method of claim 3, wherein:
   under a determination that the ending time is before the time threshold, the transmission power is determined no later than the time threshold; and
   under a determination that the ending time is not before the time threshold, the transmission power is determined immediately after receiving the at least one symbol.

5. The method of claim 1, further comprising:
   determining whether the wireless communication device is in a first situation where the wireless communication device has an additional uplink transmission having an overlapping time-domain transmission resource with the uplink transmission, or in a second situation where the wireless communication device has no additional uplink transmission having an overlapping time-domain transmission resource with the uplink transmission, wherein:
   the wireless communication node is in a first cell group for a dual connection or multi-connection of the wireless communication device; and
   the additional uplink transmission is transmitted to a wireless communication node in a second cell group for the dual connection or multi-connection.

6. The method of claim 5, further comprising:
   receiving a power modification indication from the wireless communication node, wherein the power modification indication indicates whether and how to modify at least one parameter in downlink control information (DCI) activating or scheduling the uplink transmission, and wherein the at least one parameter comprises a modulation coding scheme (MCS) and a transmit power control (TPC).

7. The method of claim 6, further comprising:
   under a determination that the wireless communication device is in the second situation, utilizing the at least one parameter in the DCI for the uplink transmission without modification; and
   under a determination that the wireless communication device is in the first situation, modifying the at least one parameter in the DCI based on the power modification indication to generate at least one modified parameter, and utilizing the at least one modified parameter for the uplink transmission.

8. The method of claim 5, further comprising:
receiving a power modification indication from the wireless communication node, wherein the power modification indication indicates whether at least one parameter in downlink control information (DCI) activating or scheduling the uplink transmission is configured for the first situation or for the second situation;
under a determination that the at least one parameter in the DCI is configured for a situation which the wireless communication device is in, utilizing the at least one parameter in the DCI for the uplink transmission without modification; and
under a determination that the at least one parameter in the DCI is configured for a situation which the wireless communication device is not in, modifying the at least one parameter in the DCI based on the power modification indication to generate at least one modified parameter, and utilizing the at least one modified parameter for the uplink transmission.

9. A method performed by a wireless communication node, the method comprising:
configuring a time threshold associated with an uplink transmission for a wireless communication device, wherein:
the time threshold indicates a latest time a transmission power of the uplink transmission should be determined; and
the time threshold is determined with consideration of at least one of:
whether the uplink transmission carries a hybrid automatic repeat request (HARQ) feedback;
whether the uplink transmission carries a Physical Uplink Control Channel (PUCCH) or a Physical Uplink Shared Channel (PUSCH) scheduled or activated by a Physical Downlink Control Channel (PDCCH); or
whether the uplink transmission carries an aperiodic Channel State Information (CSI) feedback; and
receiving the uplink transmission from the wireless communication device, wherein the uplink transmission is performed based on a transmission power that is determined based at least partially on the time threshold associated with the uplink transmission.

10. The method of claim 9, further comprising:
transmitting at least one symbol via physical downlink control channel (PDCCH) to the wireless communication device for activating or scheduling the uplink transmission, wherein the transmission power is determined based on both the time threshold and an ending time when the at least one symbol is received by the wireless communication device.

11. The method of claim 10, wherein:
under a determination that the ending time is before the time threshold, the transmission power is determined no later than the time threshold; and
under a determination that the ending time is not before the time threshold, the transmission power is determined immediately after receiving the at least one symbol.

12. The method of claim 9, wherein:
the wireless communication device is in a first situation where the wireless communication device has an additional uplink transmission having an overlapping time-domain transmission resource with the uplink transmission, or in a second situation where the wireless communication device has no additional uplink transmission having an overlapping time-domain transmission resource with the uplink transmission;
the wireless communication node is in a first cell group for a dual connection or multi-connection of the wireless communication device; and
the additional uplink transmission is transmitted to a wireless communication node in a second cell group for the dual connection or multi-connection.

13. The method of claim 12, further comprising:
transmitting a power modification indication to the wireless communication device, wherein:
the power modification indication indicates whether and how to modify at least one parameter in downlink control information (DCI) activating or scheduling the uplink transmission;
under a determination that the wireless communication device is in the second situation, the at least one parameter in the DCI is utilized for the uplink transmission without modification; and
under a determination that the wireless communication device is in the first situation, the at least one parameter in the DCI is modified based on the power modification indication to generate at least one modified parameter, and the at least one modified parameter is utilized for the uplink transmission.

14. A wireless communication device comprising a memory for storing computer instructions and a processor in communication with the memory, wherein, when the processor executes the computer instructions, the processor is configured to cause the wireless communication device to:
determine a transmission power for an uplink transmission of the wireless communication device based at least partially on a time threshold associated with the uplink transmission, wherein the time threshold indicates a latest time the transmission power should be determined, and wherein the time threshold is determined with consideration of at least one of:
whether the uplink transmission carries a hybrid automatic repeat request (HARQ) feedback;
whether the uplink transmission carries a Physical Uplink Control Channel (PUCCH) or a Physical Uplink Shared Channel (PUSCH) scheduled or activated by a Physical Downlink Control Channel (PDCCH); or
whether the uplink transmission carries an aperiodic Channel State Information (CSI) feedback; and
perform the uplink transmission based on the transmission power to a wireless communication node.

15. The wireless communication device of claim 14, wherein the time threshold is determined based on one of: a semi-static configuration by the wireless communication node or based on a system pre-definition, or a type of the uplink transmission, and wherein the time threshold is related to a time delay for the wireless communication device to prepare the uplink transmission.

16. The wireless communication device of claim 14, wherein, when the processor executes the computer instructions, the processor is configured to further cause the wireless communication device to:
receiving at least one symbol via physical downlink control channel (PDCCH) from the wireless communication node for activating or scheduling the uplink transmission, wherein the transmission power is determined based on both the time threshold and an ending time for receiving the at least one symbol.

17. The wireless communication device of claim 16, wherein:
- under a determination that the ending time is before the time threshold, the transmission power is determined no later than the time threshold; and
- under a determination that the ending time is not before the time threshold, the transmission power is determined immediately after receiving the at least one symbol.

18. A non-transitory computer readable storage medium storing instructions, wherein, when the instructions are executed by a processor in a device, the instructions are configured to cause the processor to implement a method of claim 1.

19. A non-transitory computer readable storage medium storing instructions, wherein, when the instructions are executed by a processor in a device, the instructions are configured to cause the processor to implement a method of claim 9.

20. A device comprising a memory for storing computer instructions and a processor in communication with the memory, wherein the processor, when executing the computer instructions, is configured to implement a method of claim 9.

* * * * *